United States Patent
Hinkle et al.

(10) Patent No.: US 8,522,021 B2
(45) Date of Patent: Aug. 27, 2013

(54) COMMUNICATION CHANNEL OF A DEVICE

(75) Inventors: Lee Hinkle, Houston, TX (US); Kent Biggs, Tomball, TX (US); Michael Provencher, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 12/771,115

(22) Filed: Apr. 30, 2010

(65) Prior Publication Data

US 2011/0271106 A1    Nov. 3, 2011

(51) Int. Cl.
H04L 9/00 (2006.01)
H04L 9/32 (2006.01)

(52) U.S. Cl.
USPC .................................. 713/168; 726/2; 726/3

(58) Field of Classification Search
USPC ................. 713/150, 155–156, 168–171, 193; 726/2–7, 10; 705/56, 64–67, 70–73, 75, 705/77
See application file for complete search history.

(56) References Cited

U.S. PATENT DOCUMENTS

| | | | | |
|---|---|---|---|---|
| 5,781,723 A | * | 7/1998 | Yee et al. | 726/20 |
| 6,643,701 B1 | * | 11/2003 | Aziz et al. | 709/227 |
| 6,886,095 B1 | * | 4/2005 | Hind et al. | 713/168 |
| 7,523,860 B2 | | 4/2009 | Bonalle | |
| 8,028,896 B2 | | 10/2011 | Carter | |
| 2002/0107745 A1 | | 8/2002 | Loeser | |
| 2006/0094466 A1 | | 5/2006 | Tran | |
| 2009/0061901 A1 | | 3/2009 | Arrasvuori | |
| 2009/0110248 A1 | | 4/2009 | Masuda | |
| 2011/0270694 A1 | | 11/2011 | Halim | |

FOREIGN PATENT DOCUMENTS

| | | |
|---|---|---|
| CN | 101303755 | 11/2008 |
| EP | 1710980 | 10/2006 |
| KR | 20080096721 | 11/2008 |

* cited by examiner

*Primary Examiner* — Hosuk Song
(74) *Attorney, Agent, or Firm* — Chun-Liang Kuo

(57) ABSTRACT

A method including transferring a device ID through a first communication channel between a device and a transaction device, configuring the device to send secured information in response to receiving a transaction request and sending user information to a service provider through a second communication channel in response to receiving a request to authenticate the secured information.

19 Claims, 8 Drawing Sheets

COMMUNICATION CHANNEL OF A DEVICE

BACKGROUND

When entering into a transaction, a user can access and select one or more methods of payments. The user can then present the method of payment to a transaction device and the transaction device can proceed to charge the method of payment for one or more amounts. The transaction device can then present the user one or more receipts for the user to sign when authenticating himself.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

By utilizing a first communication channel to transfer a device ID between a device and a transaction device, the device or the transaction device can accurately be identified by a service provider. Additionally, by sending user information from the device to the service provider through a second communication channel, the service provider can utilize the user information to securely authenticate the secured information of the device. As a result, the service provider can accurately determine whether or not to authorize a transaction between the device and the transaction device and a convenient user experience can be created for a user when entering into a transaction.

Figure 1:
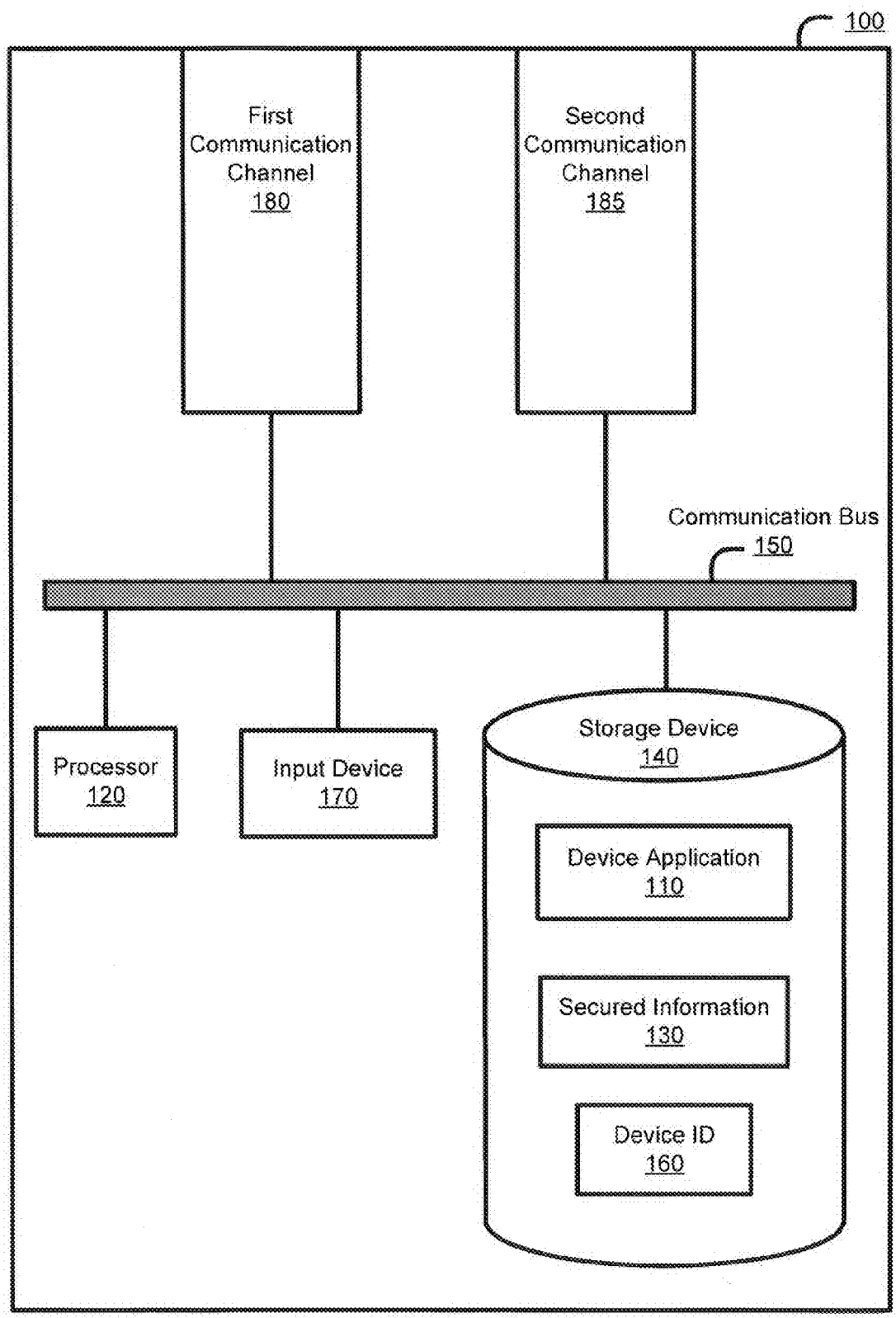
FIG. 1 illustrates a device with a first communication channel and a second communication channel according to an embodiment of the invention.

FIG. 1 illustrates a device 100 with a first communication channel 180 and a second communication channel 185 according to an embodiment of the invention. In one embodiment, the device 100 is a desktop, a laptop, a netbook, and/or a server. In another embodiment, the device 100 can be a cellular device, a PDA, and/or any other device which can include a first communication channel 180 and a second communication channel 185.

As illustrated in FIG. 1, the device 100 is coupled to a processor 120, a storage device 140, an input device 170 and a communication bus 150 for the device 100 and/or one or more components of the device 100 to communicate with one another. Further, as illustrated in FIG. 1, the storage device 140 stores a device application 110, secured information 130, and a device ID 160. In other embodiments, the device 100 includes additional components and/or is coupled to additional components in addition to and/or in lieu of those noted above and illustrated in FIG. 1.

As noted above, the device 100 includes a processor 120. The processor 120 sends data and/or instructions to one or more components of the device 100, such as the input device 170, the storage device 140 and the device application 110. Additionally, the processor 120 receives data and/or instruction from components of the device 100, such as the input device 170 and the device application 110.

The device application 110 is an application which can configure the device 100 to transfer a device ID 160 between the device 100 and a transaction device through a first communication channel 180 of the device 100. In one embodiment, the device application 110 sends a device ID 160 to the transaction device. In another embodiment, the device application 110 receives a device ID 160 from the transaction device. For the purposes of this application, a transaction device can be any device, component, and/or computing machine which can be utilized to enter into a transaction with the device 100 or a user of the device 100.

If the device ID 160 is sent from the device 100 to the transaction device, the device ID 160 will be an identification of the device 100 which is unique to the device 100 and which is utilized by the transaction device and/or a service provider to accurately identify the device 100. In another embodiment, if the device ID 160 is send to the device 100 from the transaction device, the device ID 160 will be a transaction device ID which is unique to the transaction device and is utilized by the service provider to accurately identify the transaction device.

Once the device ID 160 is transferred, the device application 110 can scan for a transaction request from the transaction device. In response to receiving a transaction request, the device application 110 can send secured information 160 to the transaction device or to the service provider. The secured information 130 includes information corresponding to a user of the device 100 which is utilized to fund a transaction between the device 100 and the transaction device. In one embodiment, the secured information 130 includes financial information associated with a user of the device 100.

The device application 110 can then send to the service provider user information detected and/or captured from the user through the second communication channel 185 in response to receiving a request to authenticate the secured information 130. For the purposes of this application, a service provider is a device, computing machine, component, entity, and/or manufacturer which can authorize or disapprove a transaction between the device 100 and the transaction device. Utilizing the user information and/or the device ID 160, the authentication can authenticate the secured information and determine whether or not to authorize or reject a transaction between the device 100 and the transaction device.

The device application 110 can be firmware which is embedded onto the device 100 and/or the storage device 140. In another embodiment, the device application 110 is a software application stored on the device 100 within ROM or on the storage device 140 accessible by the device 100. In other embodiments, the storage application 110 is stored on a computer readable medium readable and is accessible by the device 100 or the storage device 140 from a different location.

Additionally, in one embodiment, the storage device 140 is included in the device 100. In other embodiments, the storage device 140 is not included in the device 100, but is accessible to the device 100 utilizing a network interface included in the device 100. The network interface can be a wired or wireless network interface card. In other embodiments, the storage device 140 can be configured to couple to one or more ports or interfaces on the device 100 wirelessly or through a wired connection.

In a further embodiment, the device application 110 is stored and/or accessed through a server coupled through a local area network or a wide area network. The device application 110 communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

As noted above, the device application 110 is an application which can configure the device 100 to transfer a device ID 160 between the device 100 and the transaction device. In one embodiment, the device 100 additionally includes a communication component. When transferring the device ID 160, the processor 120 and/or the device application 110 instruct the communication component of the device 100 to utilize the first communication channel 180 to transfer the device ID 160.

A communication component is a device or component of the device 100 which can be instructed by the device application 110 to communicate with the transaction device and a service provider by receiving and/or sending information. Additionally, the communication component can be coupled to the device 100 or the communication component can be integrated as part of the device 100. In one embodiment, the communication component can be or include an infra red device, a Bluetooth device, a cellular or wireless radio, and/or a network device configured to wirelessly communicate with the transaction device and/or the service provider. In another embodiment, the communication component can include one or more ports or interfaces configured to physically engage and couple with the transaction device and/or the service provider.

When communicating with the transaction device and the service provider, the communication component can utilize a first communication channel 180 of the device 100 and a second communication channel 185 of the device 100. The first communication channel 180 and the second communication channel 185 are transmission mediums utilized by the device 100 and the device application 100 to receive and/or send information with the transaction device and the service provider.

Further, one or more of the transmission mediums in the first communication channel 180 and the second communication channel 185 can include one or more physical wires or devices configured to physically couple the device 100 to the transaction device and/or the service provider. One or more of the wires and/or devices can include a bus and/or a port. In another embodiment, one or more of the transmission mediums can include a wireless band and/or frequency configured to allow the device 100 to wirelessly communicate with the transaction device and the service provider.

As noted above, the processor 120 and/or the device application 110 can initially send one or more instructions for the communication component to utilize the first communication channel 180 to transfer a device ID 160 between the device 100 and the transaction device. In one embodiment, the device ID 160 includes a cellular ID of the device 100 or the transaction device. Additionally, the device ID 160 can include an international mobile equipment identity number (IMEI) of the device 100 or the transaction device. In another embodiment, the device ID 160 can be or include an identification of a user of the device or an owner of the transaction device, such as a drivers license and/or a social security number. In other embodiments, the device ID 160 can be any sequence of numbers, characters, and/or signatures generated by the device 100 or by the transaction device.

In one embodiment, before transferring the device ID 160, the device application 110 can initially secure the first communication channel 180. When securing the first communication channel 180, the device application 110 can encrypt the device ID 160 utilizing an encryption algorithm, a digital signature, and/or a sequence of numbers and/or characters. In another embodiment, the device application 110 can utilize hardware/software tokens when encrypting the device ID 160. In other embodiments, the device application 110 can secure the first communication channel 180 itself utilizing one or more of the encryption methods noted above.

Once the first communication channel 180 between the device 100 and the transaction device has been secured, the device application 110 can proceed to configure the communication component to transfer the device ID 160. In one embodiment, when sending a device ID 160 of the device 100, the communication component can access the first communication channel 180 and proceed to broadcast the device ID 160 as one or more signals. In another embodiment, the communication component can couple with the transaction device and proceed to initiate a file transfer over the first communication channel 180.

In other embodiments, when receiving a device ID 160 of the transaction device, the device application 110 configures the communication component to scan the first communication channel 180 for the device ID 160 from the transaction device. If the device ID 160 is received from the transaction device, the device application 110 can additionally configure the communication component to send the device ID 160 of the transaction device to the service provider through the second communication channel 185.

Once the device ID 160 has been transferred between the device 100 and the transaction device, the device application 110 instruct the communication component to access the first communication channel 180 and scan the first communication channel 180 for a transaction request sent by the transaction device. In other embodiments, the device application 110 can scan for the transaction request before the device ID 160 has been transferred. As noted above, the transaction device is a device, computing machine, and/or component which can be utilized to enter into a transaction with the device 100. In one embodiment, a transaction is a financial transaction where the transaction device 100 collects funds from the device 100 or from a user of the device 100.

The transaction device can send one or more transaction requests to the device 100 when the transaction device or a user of the transaction device is prompting the device 100 for a payment. In another embodiment, the transaction device sends a transaction request in response to the device 100 or a user of the device 100 prompting the transaction device that a payment would like to be made to the transaction device. A transaction request can be a signal and/or a file sent by the transaction device. The transaction request is utilized to prompt the device 100 that a transaction is being requested. The transaction request can list one or more amounts for the device 100 to pay in the transaction. In another embodiment, the transaction request further lists one or more items or services to be included in the transaction.

If the communication component detects a transaction request from the first communication channel 180, the communication component will notify the device application 110 that a transaction request has been detected. In response, the device application 110 will then proceed to access secured information 130 from the device 100 and configure the communication component to send the secured information 130.

A secured information 130 includes information corresponding to a user of the device 100 which can be utilized to fund or complete a transaction with the transaction device. Further, a user can be any person who can access the device 100 and can have one or more of the secured information 130 associated with him/her. In one embodiment, the secured information 130 includes financial information such as a credit card of the user, a debit card of the user, a gift card of the user, and/or a bank account of the user. Additionally, the secured information 130 can include an account number, an expiration date, a name of the user, and/or a billing address of the user.

As illustrated in FIG. 1, one or more secured information 130 and the device ID 160 can be stored as one or more files on the storage device 140. In other embodiments, one or more of the secured information 130 and the device ID 160 can be stored on additional locations accessible to the device application 110 in addition to and/or in lieu of those noted above and illustrated in FIG. 1.

In one embodiment, if the device ID 160 was sent to the transaction device, device application 110 will also send the secured information 130 to the transaction device through the first communication channel 180. As noted above, the first communication channel 180 can be secured when the device 100 is communicating with the transaction device. In another embodiment, if the device ID 160 was received from the transaction device, the secured information 130 is sent to the service provider through the second communication channel 185. Similar to the first communication channel 180, the second communication channel 185 can be secured when the device 100 is communicating with the service provider.

Once the secured information 130 has been sent or broadcasted, the device application 110 proceeds to configure the communication device to access the second communication channel 185 of the device 100 and scan the second communication channel 185 for a request received from a service provider. The request can include a prompt for the device 100 to authenticate secured information 130 sent from the device 100.

The request can be sent by the service provider through the second communication channel 185. In one embodiment, if the device application 110 previously sent the secured information 130 to the transaction device, the service provider sends the request in response to the transaction device prompting the service provider to authenticate the received secured information 130.

In another embodiment, if the device application 110 previously sent the secured information 130 to the service provider, the request to authenticate the secured information 130 is sent in response to the service provider receiving the device ID 160 and the secured information 130. As noted above, the service provider is a device, a component, a computing machine, a manufacturer and/or an entity which can authorize and/or reject a transaction between the device 100 and the transaction device.

In response to detecting and receiving the request, the device application 110 will proceed to prompt the user of the device to authenticate himself/herself using an input device 170 of the device 100. An input device 170 is a component or device configured to detect the user entering information. In another embodiment, the input device 170 is be configured to capture information of the user. The input device 170 can include one or more alphanumeric pads. In another embodiment, the input device can be or include an image capture device, a microphone, and/or a biometric device. In other embodiments, the input device can be any additional device or component which can be utilized by the device 100 to detect and/or capture information from the user.

The information from the user can include one or more sequence of numbers and/or characters. In another embodiment, the information from the user can include an image of the user. The image of the user can be an image of the user's face or an image of the user's fingerprint. In other embodiments, the information from the user can include a voice of the user, a password, and/or any other form of authentication detected or captured by the input device 170.

Once the information from the user is detected or captured, the device application 110 can configure the communication component to utilize the second communication channel 185 when sending the user information to the service provider. Utilizing the user information received from the device 100, the service provider can proceed to authenticate the secured information 130 by comparing the user information to predefined information associated with the secured information 130. In one embodiment, the service provider further authenticates the secured information by ensuring that the device ID 160 is included in the predefined information or is listed to be associated with the secured information. In response to authenticating the secured information 130, the service provider can authorize or reject a transaction between the device 100 and the transaction device.

Figure 2:
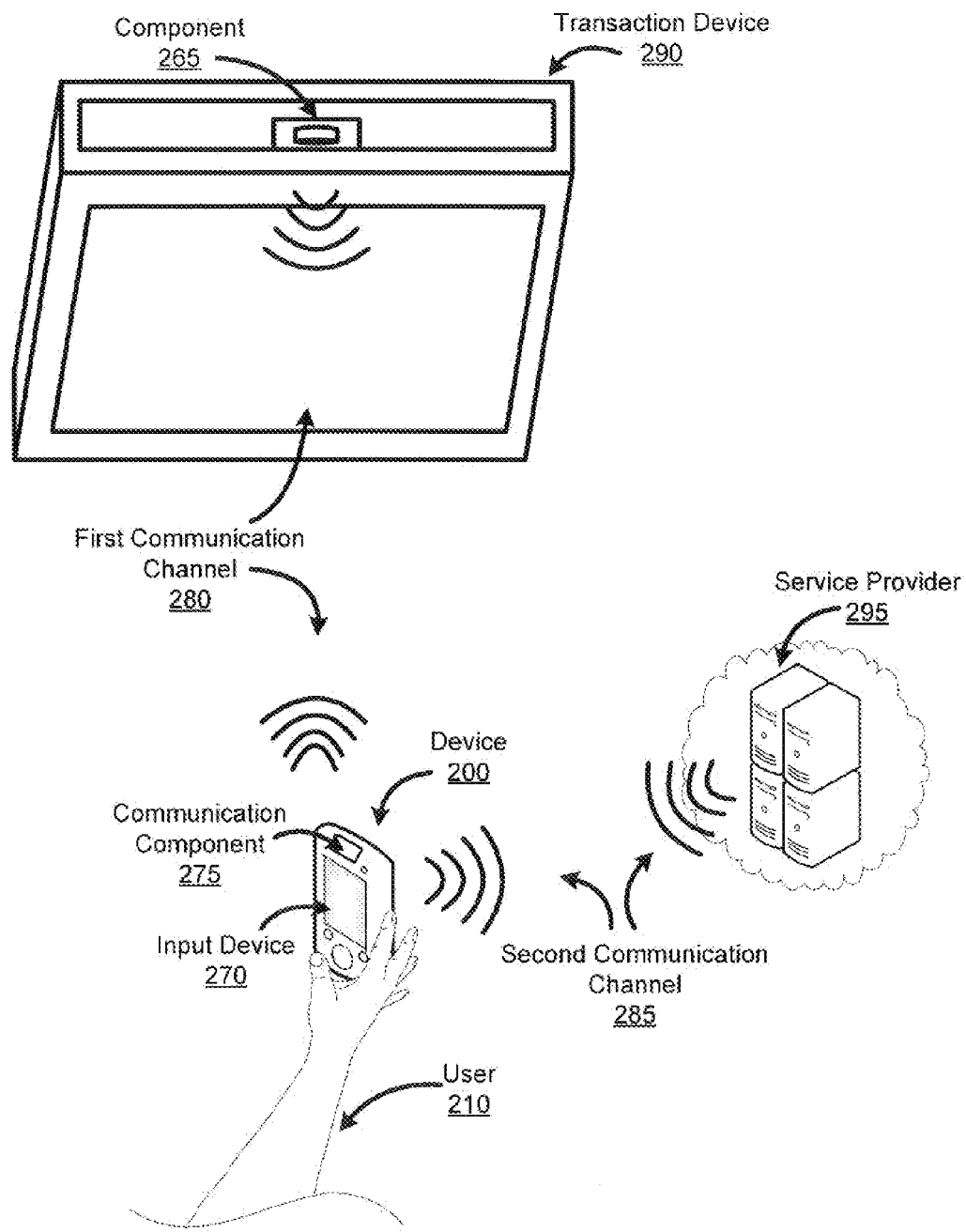
FIG. 2 illustrates a device communicating with a transaction device through a first communication channel and a service provider through a second communication channel according to an embodiment of the invention.

FIG. 2 illustrates a device 200 communicating with a transaction device 290 through a first communication channel 280 and a service provider 295 through a second communication channel 285 according to an embodiment of the invention. As illustrated in FIG. 2, in one embodiment, the device 200 is a hand held device. The hand held device can include a cellular device or a PDA device. In other embodiments, the device 200 includes a computing machine, and/or any other device a communication component 275 can be coupled to.

As shown in FIG. 2, the communication component 275 is a device and/or component coupled to the device 200 which can be configured by a device application of the device 200 to communicate with a transaction device 290 and a service provider 295. The communication component 275 can include an infrared device, a Bluetooth device, a cellular radio device, and/or a wireless LAN device configured to wirelessly communicate with the transaction device 290 and/or the service provider 295. In other embodiments, the communication component 275 can include one or more ports and or devices configured to physically couple with the transaction device 290 and/or the service provider 295.

As noted above, the transaction device 290 is a device which can issue a transaction request to the device 200 and complete a transaction with the device 200. In one embodiment, the transaction device 290 is a close proximity device. As illustrated in FIG. 2, the transaction device 290 can be a kiosk. In another embodiment, the transaction device 290 can be or include a cash register and/or any other point of sale device which can send a transaction request to the device 200.

As shown in the present embodiment, the transaction device 290 can include one or more components 265 configured to detect when the device 200 is within proximity of the transaction device 290 and communicate with the device 200. As illustrated in FIG. 2, when communicating with the transaction device 290, the device application of the device 200 instructs the communication component 275 to utilize a first communication channel 280 of the device 200.

As noted above, the device 200 can include one or more communication channels and the communication component 275 can utilize one or more of the communication channels when communicating with the transaction device 290 and the service provider 295. Additionally, a first communication channel 280 includes one or more transmission mediums configured to allow the communication component 175 of the device 100 to communicate with the transaction device 290. As shown in the present embodiment, the transmission medium in the first communication channel 280 can include a wireless band and/or frequency allowing the device 100 to wirelessly communicate with the transaction device 290.

As noted above, when communicating with the transaction device 290, a device ID can be transferred over the first communication channel 280 between the device 200 and the transaction device 290. Additionally, the transaction device 290 can send a transaction request to the device 200 over the first communication channel 280. As noted above, the transaction request is sent by the transaction device 290 when the transaction device 290 is prompting the device 200 for a payment or when the device 200 is prompting the transaction device 290 that it would like to make a payment. In one embodiment, the device application additionally configures the communication component 275 to send secured information from the device 200 to the transaction device 290 over the first communication channel 280.

In another embodiment, the device application configures the communication component 275 to send a device ID of the transaction device and the secured information to a service provider 295 through a second communication channel 285. As noted above, the service provider 295 is a device, a computing machine, manufacturer, and/or an entity which can authorize and/or reject a transaction between the device 200 and the transaction device 290. In one embodiment, the service provider 295 is a cellular provider or a financial institution.

When communicating with the service provider 295, the device 200 instructs the communication component 275 to utilize the second communication channel 285. In one embodiment, the second communication channel 285 is a separate communication channel from the first communication channel 280. Additionally, the second communication channel 285 utilizes one or more transmission mediums which are separate from one or more transmission mediums used in the first communication channel 280.

When communicating with the service provider, the device 200 can receive a request to authenticate the secured information through the second communication channel 285. Additionally, the device 200 can send the service provider 295 user information captured from an input device 270 of the device 200. Utilizing the user information and/or the device ID, the service provider 295 can proceed to authorize or reject a transaction between the device 200 and the transaction device 290 in response to authenticating the secured information.

Figure 3:
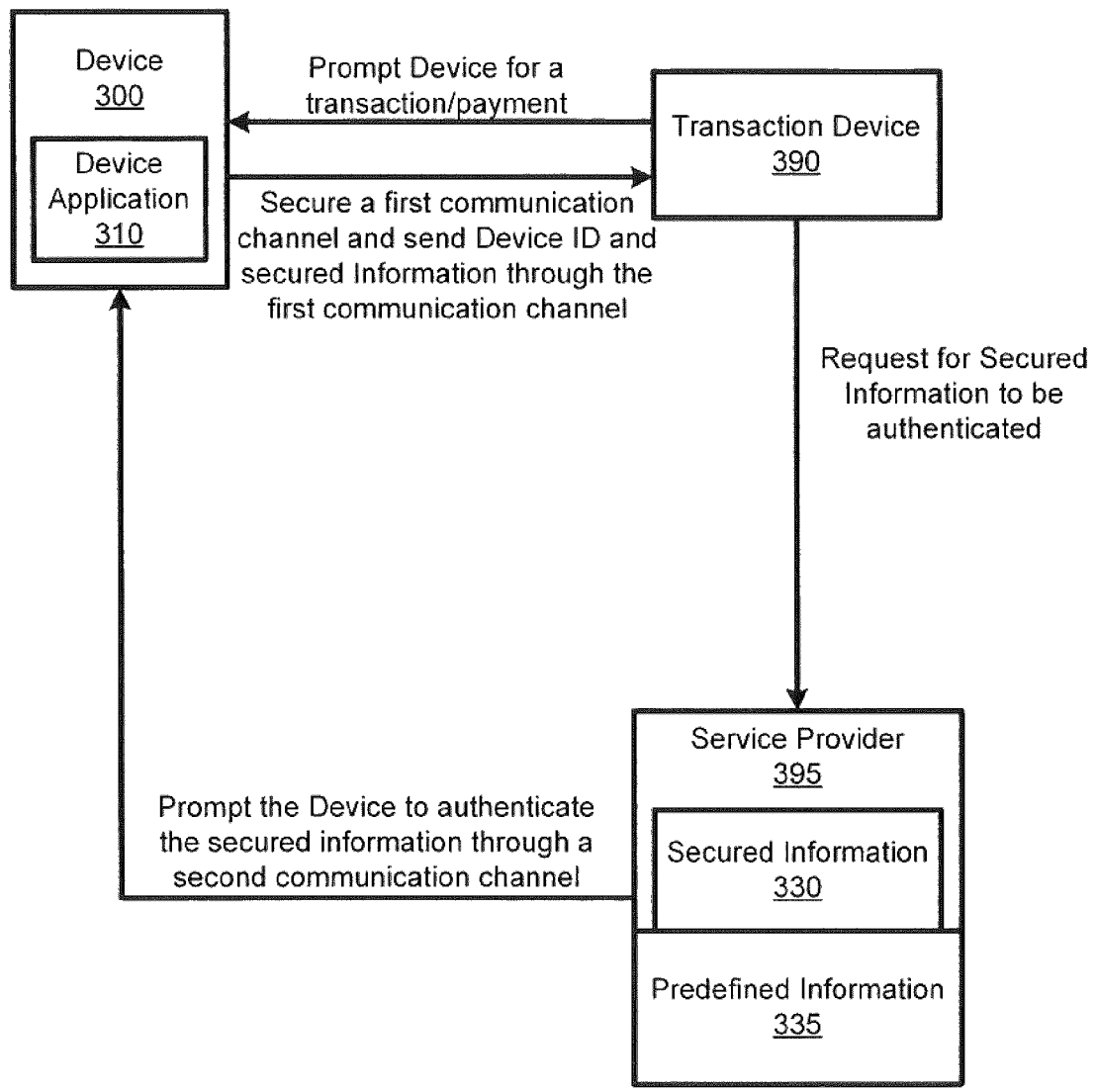
FIG. 3 illustrates a block diagram of a device receiving a request to authenticate secured information according to an embodiment of the invention.

FIG. 3 illustrates a block diagram of a device 300 receiving a request to authenticate secured information 330 according to an embodiment of the invention. In one embodiment, as illustrated in FIG. 3, a transaction device 390 initially prompts the device 300 for a transaction and/or a payment by sending a transaction request through a first communication channel of a device 300. In response to detecting the transaction request, a communication component will proceed to notify the device application 310 that a transaction request has been received.

The device application 310 then proceeds to select a secured information to send to the transaction device and the device ID. As noted above, the device can access one or more secured information 330 which is associated with a user of the device 300. The secured information 330 can include financial information, such as a credit card, a debit card, a gift card, a bank account, and/or any additional financial information. Further, the device ID can include an IMEI of the device 300 or the transaction device 390, a cellular ID of the device 300 or the transaction device 390, a social security number of a user, a driver's license number of a user, and/or any sequence of numbers, characters, generated from the device 300 or the transaction device 390.

In one embodiment, once a secured information 330 has been selected, the device application 310 will proceed to secure a first communication channel of the device and send the device ID and the secured information 330 to the transaction device 390 through the first communication channel. When securing the first communication channel, the device application 310 can encrypt the secured information 330 and the device ID. In another embodiment, when securing the first communication channel, the device application 310 can encrypt the first communication channel itself.

As illustrated in FIG. 3, in response to receiving the device ID and the secured information, the transaction device 390 can communicate with a service provider 395 and request for the service provider to authenticate the secured information 330. When requesting the service provider 395 to authenticate the secured information 330, the transaction device 390 can send one or more details of the secured information 330 from the device 300. In another embodiment, the transaction device 390 sends the secured information 330 and/or the device ID to the service provider 395 for authentication.

In other embodiments, the device application 310 will not send the transaction device a device ID of the device 300 and secured information 330. Instead, the device application 310 will configure the communication component to receive a transaction device ID of the transaction device 390 and the device application 310 will then send the transaction device ID and secured information 330 to a service provider 395 through a second communication channel. The device application 310 can additionally secure the second communication channel before sending the transaction device ID and/or the secured information 330.

In response to receiving a request to authenticate the secured information 330 or in response to receiving a transaction device ID and secured information 330, the service provider 395 can access one or more databases and/or lists. The database and/or list can include one or more secured information associated with one or more users of the device. The service provider 395 will scan the database and/or the list for matching secured information 330. If a match is found, the service provider will identify predefined information 335 listed to be associated with the matching secured information 330. The service provider 395 then sends the device 300 a prompt or request to authenticate the secured information 330 through a second communication channel of the device 300.

Figure 4:
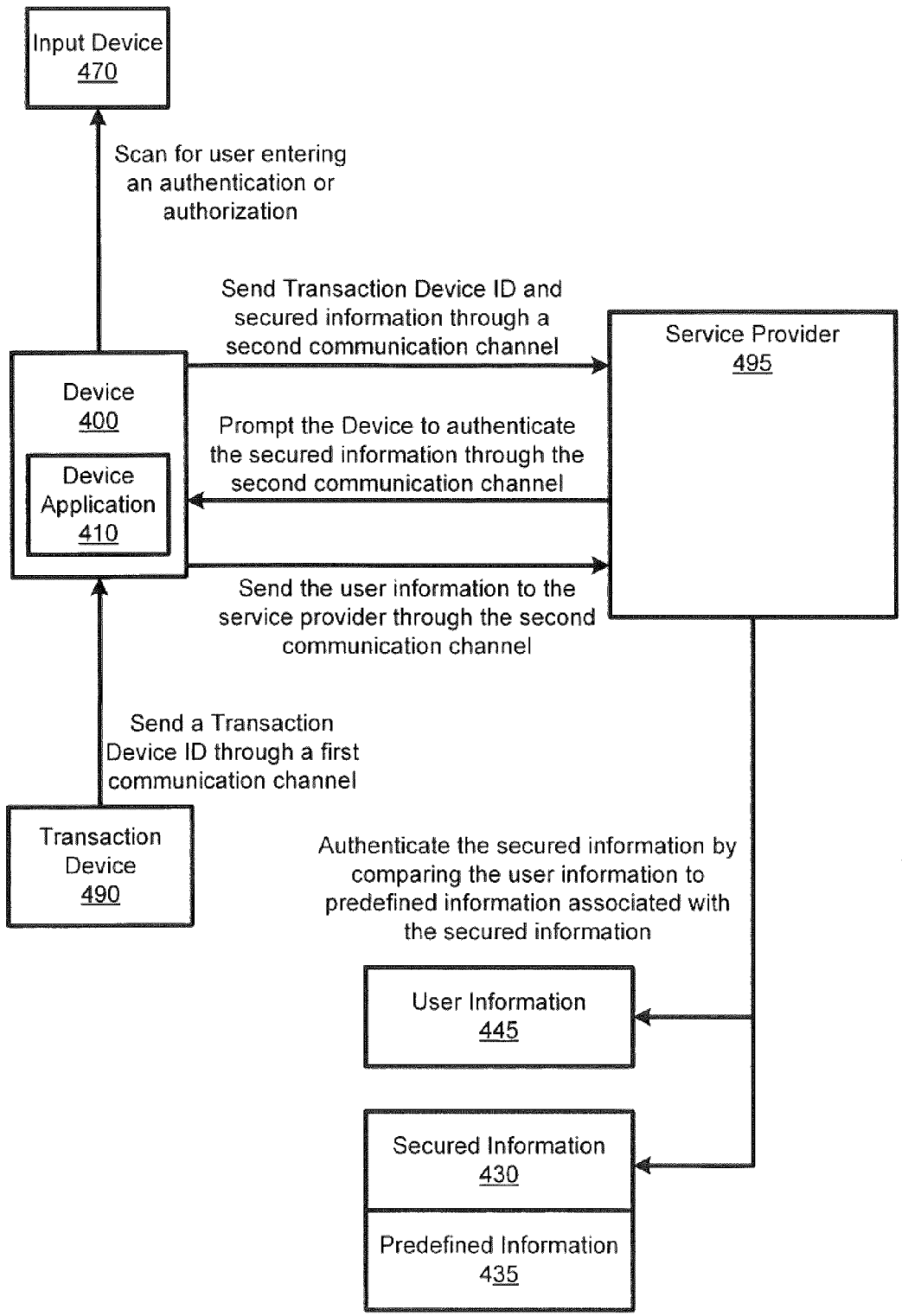
FIG. 4 illustrates a block diagram of a service provider authenticating secured information according to an embodiment of the invention.

FIG. 4 illustrates a block diagram of a service provider 495 authenticating secured information 430 according to an embodiment of the invention. In one embodiment, as illustrated in FIG. 4, a transaction device 490 sends a device ID of the transaction device 490 to a device 400 through a first communication channel. As illustrated in the present embodiment, in response to receiving the device ID from the transaction device 490, the device application 410 instructs a communication component to send the device ID of the transaction device and the secured information 430 to a service provider 495 through a second communication channel.

Upon receiving the transaction device ID and the secured information, the service provider 495 can send a request for the device 400 to authenticate the secured information. In other embodiments, the request to authenticate the secured information is issued by the service provider 495 in response to the transaction device 490 querying the service provider 495 for an authentication of secured information received from the device 400.

As illustrated in FIG. 4, in response to receiving the request, the device application 410 configures an input device 470 of the device 400 to detect and/or capture information from the user. When configuring the input device 470, the device application 410 instructs the input device 470 to scan for the user entering an authorization and/or an authentication. The user can authorize and/or authenticate himself by accessing or unlocking the device 400. In another embodiment, the user can enter one or more inputs. In other embodiments, the input device 470 captures an image and/or a voice of the user for the authentication and/or authorization.

Once the input device 470 has detected and/or captured the information from the user, the device application 410 can proceed to send the user information to the service provider 495 through a second communication channel of the device 400. Utilizing the user information 445 from the device 400, the service provider 495 will attempt to authenticate the secured information 430.

When authenticating the secured information 430, the service provider 495 will compare the received user information 445 to predefined information 435 listed to be associated with the secured information 430. In one embodiment, the predefined information 435 can include a password of a user, an image of the user, and/or a voice of the user. As noted above, the service provider 495 can access the predefined information 435 by scanning a database and/or a list of secure information for a matching secured information. The matching secured information will list an associated predefined information 435 utilized by the service provider 495 to compare with the user information.

In one embodiment, the predefined information 435 additionally lists one or more device IDs and the service provider 495 will compare the received device ID to insure it is listed to be included in the predefined information 435 and the device 400 or the transaction device 490 is authorized to use the secured information 430 in a transaction. If the predefined information 435 matches the user information 445 and/or the device ID is included in the predefined information, the service provider will determine that the secured information has been successfully authenticated.

In another embodiment, if the predefined information 435 does not match the user information 445 or if the device ID is not included in the predefined information 435, the service provider 495 will determine what the secured information 430 has failed authenticated. In response to authenticating the secured information 430 with the user information 445, the service provider 495 will authorize or reject the transaction between the device 400 and a transaction device.

Figure 5:
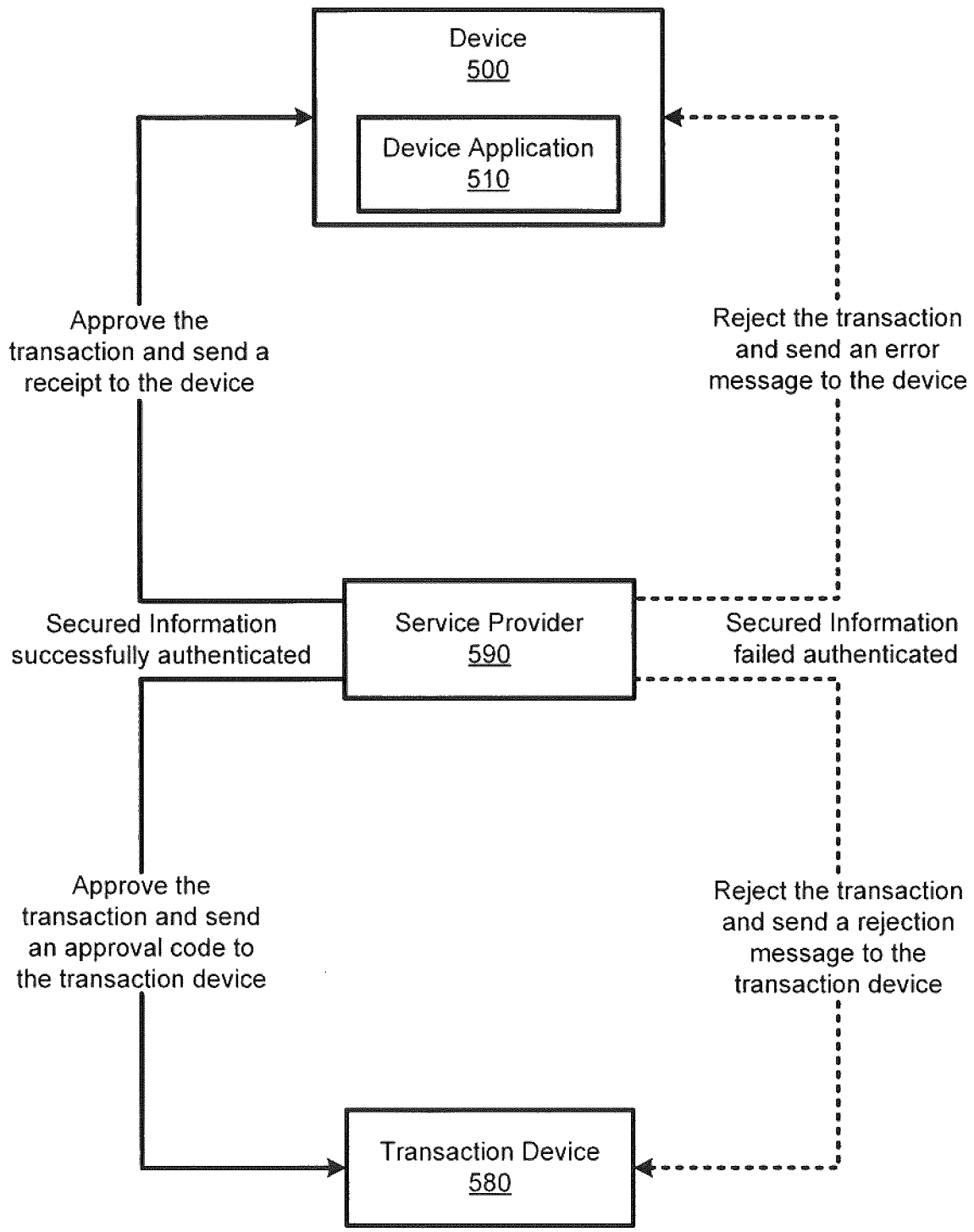
FIG. 5 illustrates a block diagram of a service provider authorizing or rejecting a transaction according to an embodiment of the invention.

FIG. 5 illustrates a block diagram of a service provider 590 authorizing or rejecting a transaction according to an embodiment of the invention. As noted above, the service provider 590 authenticates secured information of a device 500 by comparing user information received from the device 500 to predefined information listed to be associated with the secured information.

As illustrated in FIG. 5, in response to successfully authenticating the secured information, the service provider 590 approves the transaction and sends an approval code to the transaction device 580. Additionally, when authorizing the transaction, the service provider 590 can allow the transaction device 580 to collect an amount listed in a transaction request. In one embodiment, the service provider 590 can access an account listed in the secured information and proceed to transfer funds from the account to the transaction device 580.

The service provider 590 can accurately identify the transaction device 580 utilizing a device ID of the device or the transaction device 580. Additionally, as shown in FIG. 5, if the secured information is successfully authenticated, the service provider 590 sends a receipt to the device 500. The receipt can be a digital file which includes details of an account of the user's being charged. In one embodiment, the device application 510 can additionally configure a display device of the device 500 to render the receipt for a user to view.

In another embodiment, if the authentication of the secured information 570 has failed, the service provider 590 will reject the transaction between the device 500 and the transaction device 590. Additionally, the service provider 590 sends a rejection message to the transaction device 590 indicating that authentication of the secured information has failed. Further, the service provider can send the device 500 an error message to the device indicating that the authentication has failed and the transaction is rejected. The device application 510 can then proceed to configure the display device of the device 500 to render the error message for the user to review.

Figure 6:
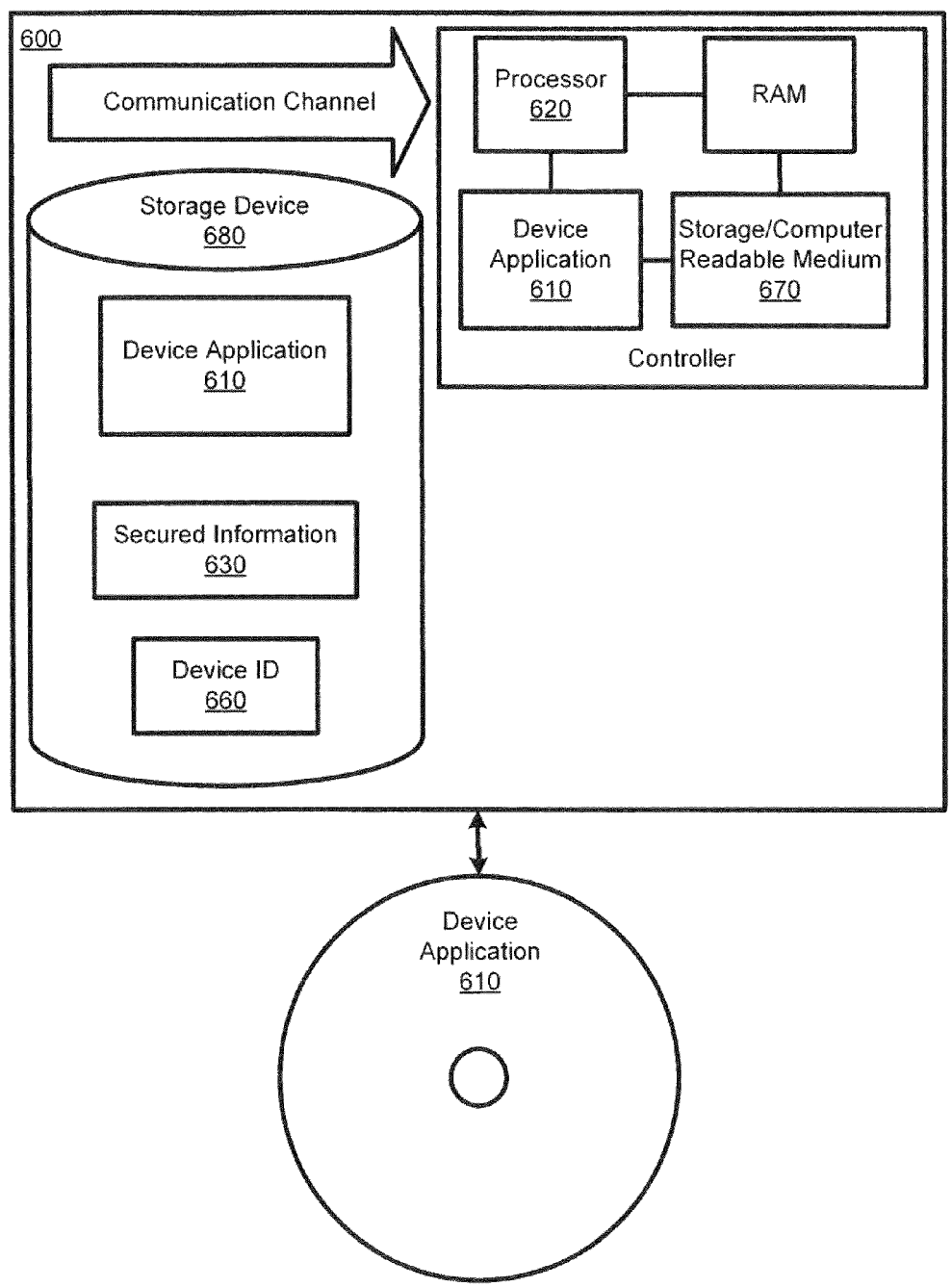
FIG. 6 illustrates a device with an embedded device application and a device application stored on a removable medium being accessed by the device according to an embodiment of the invention.

FIG. 6 illustrates a device 600 with an embedded device application 610 and a device application 610 stored on a removable medium being accessed by the device 600 according to an embodiment of the invention. For the purposes of this description, a removable medium is any tangible apparatus that contains, stores, communicates, or transports the application for use by or in connection with the device 600. As noted above, in one embodiment, the device application 610 is firmware that is embedded into one or more components of the device 600 or the storage device 640 as ROM. In other embodiments, the device application 410 is a software application which is stored and accessed from a hard drive, a compact disc, a flash disk, a network drive or any other form of computer readable medium that is coupled to the device 600.

Figure 7:
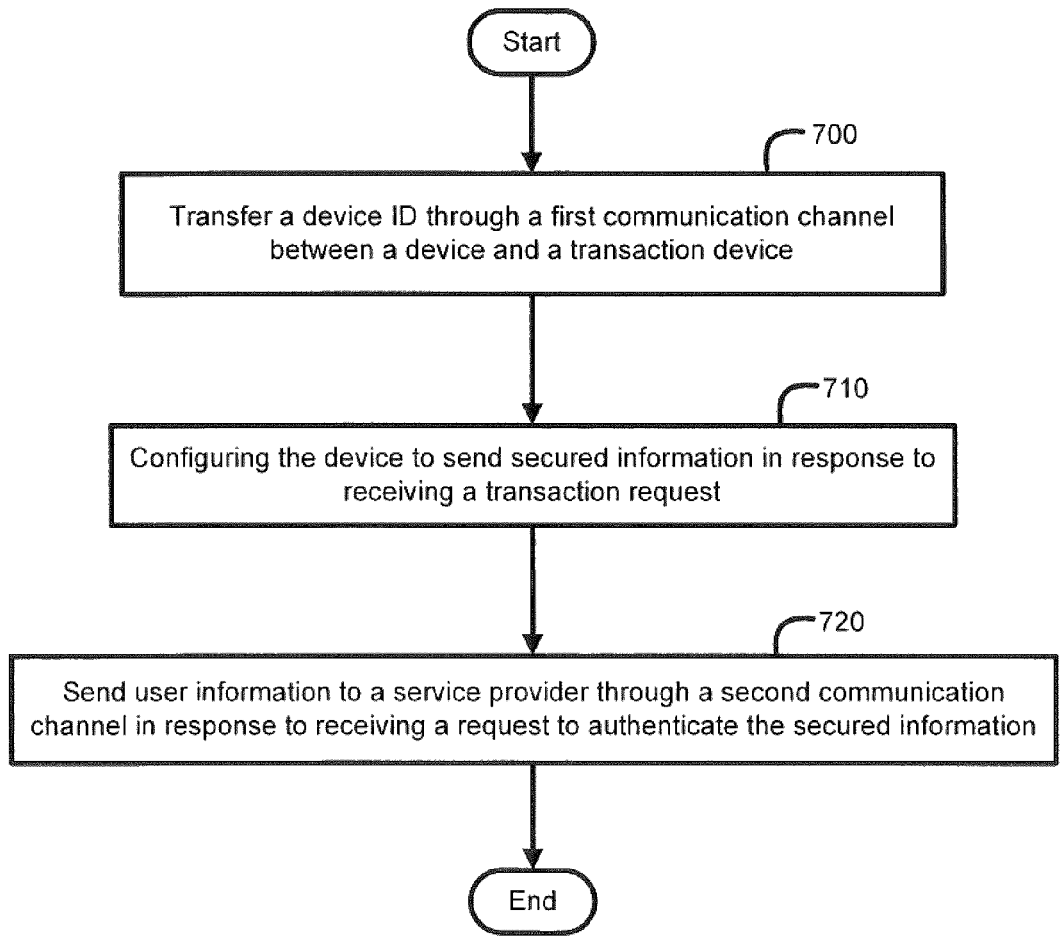
FIG. 7 is a flow chart illustrating a method for authenticating secured information according to an embodiment of the invention.

FIG. 7 is a flow chart illustrating a method for authenticating secured information according to an embodiment of the invention. The method of FIG. 7 uses a device with a first communication channel and a second communication channel. Additionally, the device is coupled to a communication component, an input device, a storage device, a processor, and a device application. In other embodiments, the method of FIG. 7 uses additional components and/or devices in addition to and/or in lieu of those noted above and illustrated in FIGS. 1, 2, 3, 4, 5, and 6.

As noted above, a processor of the device initially sends one or more instructions for a device application to configure the communication component to transfer a device ID between the device and a transaction device 700. As noted above, the transaction device can be a kiosk, a cash register, and/or any computing machine configured to enter into a transaction with the device.

Additionally, the communication component is a component or device configured to communicate with a transaction device and a service provider through a first communication channel and a second communication channel. In one embodiment, the communication component includes an infrared device, a Bluetooth device, a network device, and/or a wireless LAN device. In another embodiment, the communication component includes a port or interfaces configured to physically couple with and engage the transaction device.

The communication component can communicate with the transaction device through a wireless or through a physical connection. Further, when communicating with the transaction device, the device application can configure the communication component to use the first communication channel of the device. The first communication channel includes a transmission medium including one or more wires. In another embodiment, the transmission medium includes one or more wireless frequencies or bands.

In one embodiment, the device application instructs the communication component to send a device ID of the device to the transaction device through the first communication channel. In another embodiment, the device application instructs the communication component to scan the first communication channel for a device ID of the transaction device sent by the transaction device. As noted above, the device ID is an identification of the device or the transaction device used by a service provider to accurately identify the device and/or the transaction device.

Once the device ID has been transferred, the device application will instruct the communication component to scan the first communication channel for a transaction request. The transaction request is a request sent by a transaction device prompting the device for a payment for one or more items or services. In other embodiments, the device application can scan for the transaction request before transferring the device ID and the device ID can be transferred in response to detecting the transaction request. The transaction request can list one or more items, services, and/or an amount for the device to pay.

In response to receiving the transaction request, the device application can access secured information associated with a user of the device and send the secured information 710. In one embodiment, if the device application sent a device ID of the device to the transaction device, the device application will proceed to send the secured information to the transaction device through the first communication channel. In another embodiment, if the device application received a device ID of the transaction device from the transaction device, the device application will proceed to send the device ID of the transaction device and the secured information to the service provider through a second communication channel.

Similar to the first communication channel, the second communication channel includes one or more transmission mediums, separate from the transmission mediums of the first communication channel, which are configured to allow the device to communicate with the service provider through a wireless and/or through a physical connection.

The secured information includes one or more information which the transaction device can utilize to complete a transaction with the device. In one embodiment, the secured information includes information of a user's credit card, debit card, gift card, and/or bank account. In one embodiment, when sending the secured information, the device application additionally secures the first communication channel and/or the second communication channel. As noted above, when securing one or more communication channels, the device application can encrypt the device ID and the secured ID or the device application can encrypt one or more of the communication channels themselves.

Once the device ID and the secured information have been sent, the device application can configure the communication component to proceed to scan a second communication channel of the device for a request to authenticate the secured information. Additionally, in response to receiving the request, the device application will proceed to prompt the user of the device to authenticate himself and/or the secured information.

The device application will configure an input device of the device to detect and/or capture information of the user. The input device can be an alphanumeric pad, an image capture device, a biometric device, and/or a microphone. In other embodiments, the input device can be any additional device configured to capture and/or detect information from the user. The detected and/or captured information from the user can include a password entered by the user, an image captured of the user, and/or a voice captured of the user. Once the user information has been detected and/or captured, the device application can configure the communication component to send the user information to the service provider through the second communication channel 720.

Utilizing the user information, the service provider can authenticate the secured information. In one embodiment, the secured information is further authenticated using the device ID. In response to authenticating the secured information, the service provider can authorize or reject a transaction between the device and the transaction device. The method is then complete. In other embodiments, the method of FIG. 7 includes additional steps in addition to and/or in lieu of those depicted in FIG. 7.

Figure 8:
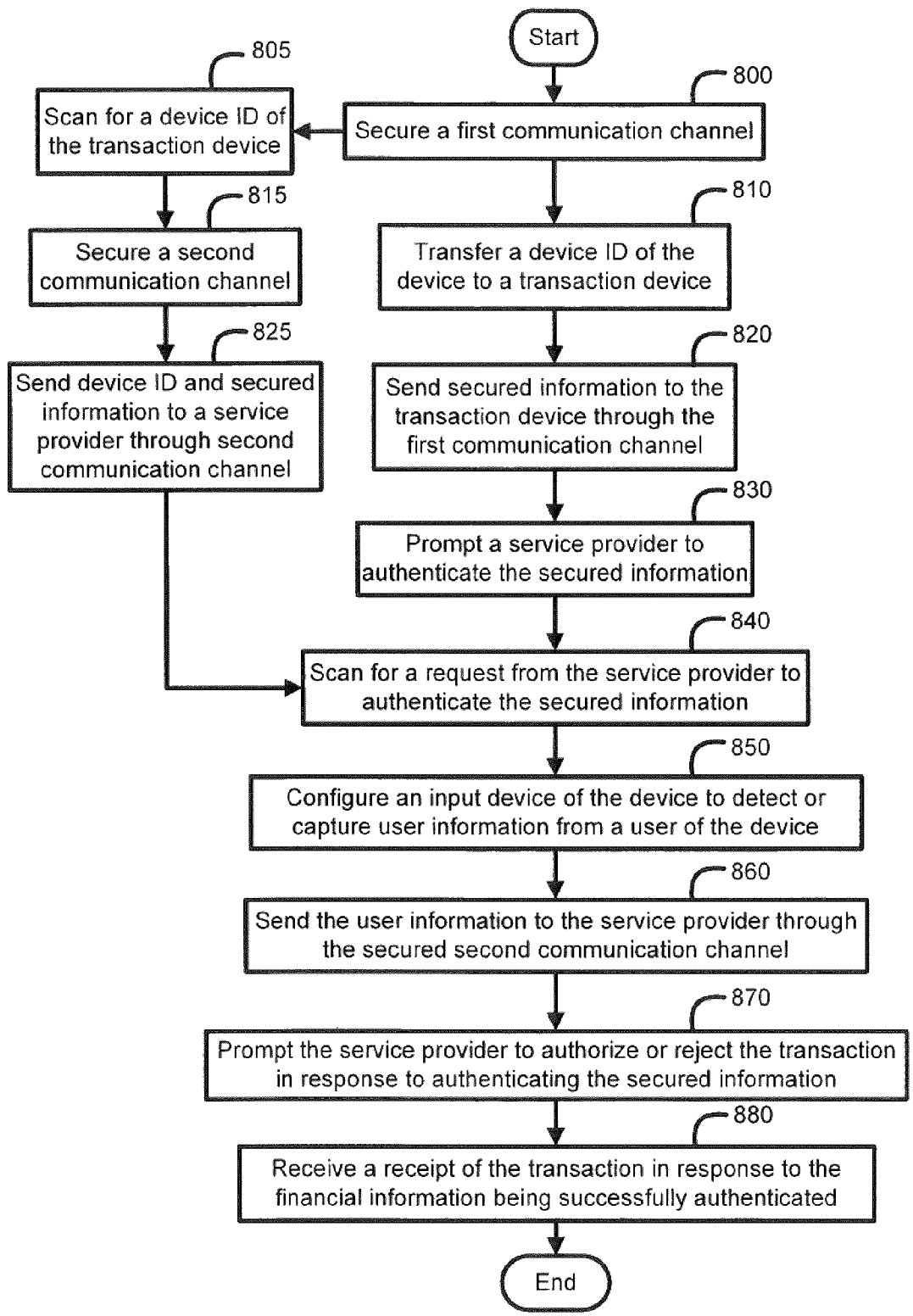
FIG. 8 is a flow chart illustrating a method for authenticating secured information according to another embodiment of the invention.

FIG. 8 is a flow chart illustrating a method for authenticating financial information according to another embodiment of the invention. Similar to the method of FIG. 7, the method of FIG. 8 uses a device with a first communication channel and a second communication channel. Additionally, the device is coupled to a communication component, an input device, a storage device, a processor, and a device application. In other embodiments, the method of FIG. 8 uses additional components and/or devices in addition to and/or in lieu of those noted above and illustrated in FIGS. 1, 2, 3, 4, 5, and 6.

In one embodiment, a device application is initially instructed by a processor of the device to secure a first communication channel of the device 800. As noted above, when securing the first communication channel, the device application can encrypt the secured information and a device ID or the device application can encrypt first communication channel itself. Once the first communication channel has been secured, the device application configures the communication component to transfer a device ID between the device and the transaction device. The transaction device can be a close proximity device configured to enter into a transaction with the device. In one embodiment, the device ID is an identification of the device and the device application configures the communication component to send the device ID to the transaction device over the first communication channel 810.

Once the device ID has been sent to the transaction device, the device application configures the communication component to scan for a transaction request from transaction device. When scanning for the transaction request, the device application sends an instruction for the communication component to scan the first communication channel for one or more signals or files. In one embodiment, the transaction request is sent by the transaction device in response to the transaction device prompting the device for a transaction or payment. In another embodiment, the transaction request is sent by the transaction device in response to the device prompting the transaction device that it would like to make a payment.

Once the transaction request has been detected, the device application will proceed to select secured information from the device and send the secured information to the transaction device 820. As noted above, the device can include or access one or more secured information. Additionally, one or more of the secured information can include financial information which is utilized to complete a transaction with the transaction device. Further, if more than one secured information is available to be sent to the transaction device, the device application can configure a display device to render one or more of the available secured information. The device application can then prompt the user to select one or more of the secured information using the input device.

Additionally, as noted above, once the device ID and the secured information have been sent to the transaction device, the service provider can be prompted to authenticate a user of the device and/or the secured information 830. The prompt can be sent by the transaction device or by the device. As noted above, the service provider can include an entity, a device, and/or a computing machine configured to authorize and/or reject a transaction between the device and the transaction device in response to authenticating the secured information. The entity can include a financial institution and/or manufacturer. Further, the device application can configure the communication component to scan a second communication channel for a request from the authenticate the secured information which was sent to the transaction device 840.

In another embodiment, the device application does not send a device ID of the device and the secured information is not sent to the transaction device. As illustrated in FIG. 8, the device application can configure the communication component to initially scan a first communication channel for a device ID of the transaction device 805. Once the device ID of the transaction device has been received from the transaction device, the device application can proceed to secure a second communication channel 815. The device application secures and/or encrypts the second communication channel using one or more of the methods noted above.

Once the second communication channel has been secured, the device application can proceed to send a service provider the device ID of the transaction device and secured information from the device 825. The device application can then configure the communication component to scan the second communication channel for a request from the service provider to authenticate the secured information 840.

In response to receiving the request, the device application configures an input device to detect and/or capture information from the user 850. The information from the user can include a password entered from the user, an image of the user, a voice of the user, and/or any other information of the user. Utilizing the information from the user, the device application can configure the communication component to utilize the secured second communication channel to send the user information to the service provider through the second communication channel 860. In one embodiment, the device application can additionally send a prompt for the service provider authorize or reject the transaction between the device and the transaction device in response to authenticating the secured information with the user information 870. As noted above, when authenticating the secured information, the service provider can access a list and/or database of one or more secured information.

The service provider will scan for the matching secured information and will proceed to identify a predefined information listed to be associated with the secured information. Additionally, when authenticating the secured information, the service provider will then compare the user information to the predefined information. In one embodiment, the predefined information additionally lists one or more device IDs and the service provider will compare the received device ID to insure it is listed to be included in the predefined information. If the device ID is included or associated with the predefined information, the service provider will determine that the device or the transaction device is authorized to use the secured information in a transaction.

If the predefined information matches the user information and/or the device ID is included in the predefined information, the service provider will determine that the secured information has been successfully authenticated. If the predefined information does not match the user information or if the received device ID is not included in the predefined information, the service provider will determine that the secured information has failed authentication. In response to authenticating the secured information, the service provider will authorize or reject the transaction. If authentication of the secured information has failed, then the service provider rejects the transaction and sends a failed authentication message to the transaction device and the device.

If the secured information is successfully authenticated, the service provider approves the transaction and sends the device a receipt of the transaction 880. Further, the service provider releases funds and sends an approval code to the transaction device. The method is then complete. In other embodiments, the method of FIG. 8 includes additional steps in addition to and/or in lieu of those depicted in FIG. 8.

What is claimed is:

1. A method comprising:
   transferring, by a device, a device ID of the device through a first communication channel between the device and a transaction device;
   configuring the device to send secured information in response to receiving a transaction request from the transaction device; and
   sending, by the device, user information to a service provider through a second communication channel in response to receiving a request to authenticate the secured information.

2. The method of claim 1 wherein the device ID includes an identification of the device sent by the device to the transaction device through the first communication channel.

3. The method of claim 1 wherein the device sends the secured information to the transaction device through the first communication channel.

4. The method of claim 1 wherein the device sends the secured information to the service provider through the second communication channel.

5. The method of claim 1 wherein the request to authenticate the secured information is received by the device from the service provider through the second communication channel.

6. The method of claim 5 wherein the service provider sends the request to authenticate the secured information in response to receiving a prompt from the transaction device.

7. The method of claim 1 further comprising securing the first communication channel when communicating with the transaction device.

8. The method for claim 1 wherein the service provider authorizes a transaction between the device and the transaction device in response to authenticating the secured information with at least one from the group consisting of the device ID and the user information.

9. The method of claim 1, wherein the secured information is sent by the device to fund a transaction between the device and the transaction device, and wherein the transaction request is a request to pay in the transaction.

10. The method of claim 9, wherein the secured information is selected from among credit card information, debit card information, gift card information, and bank account information.

11. The method of claim 1, wherein the user information includes information about a user of the device.

12. The method of claim 1, wherein the service provider is separate from the transaction device.

13. A device comprising:
   a storage medium;
   a processor;
   a communication component to transfer a device ID of the device through a first communication channel between the device and a transaction device;
   a device application executable by the processor from the storage medium and configured to:
      send secured information in response to receiving a transaction request from the transaction device, and
      send user information captured from an input device to a service provider through a second communication channel, in response to a request, received by the device, to authenticate the secured information.

14. The device of claim 13 further comprising an input device configured to capture the user information for the device application to send the user information to the service provider to utilize when authenticating the secured information.

15. The device of claim 14 wherein the input device includes at least one from the group consisting of a sensor, an alphanumeric pad, a biometric device, a microphone, and an image capture device.

16. The device of claim 13 wherein the communication component is additionally configured to utilize the second communication channel when receiving the request to authenticate the secured information and when sending the user information to the service provider.

17. A non-transitory computer-readable medium storing a program that upon execution causes a device to:
   instruct a communication component of the device to utilize a first communication channel to transfer a device ID of the device between the device and a transaction device;
   send secured information in response to receiving a transaction request from the transaction device;
   send to a service provider user information through a second communication channel in response to receiving a request to authenticate the secured information.

18. The computer-readable medium of claim 17 wherein the service provider sends the transaction device an approval code in response to the secured information being successfully authenticated with the user information.

19. The computer-readable medium of claim 17 wherein the program upon execution causes the device to further secure the first communication channel and the second communication channel by encrypting at least one from the group consisting of the device ID, the secured information, and the user information.

* * * * *

UNITED STATES PATENT AND TRADEMARK OFFICE
CERTIFICATE OF CORRECTION

PATENT NO. : 8,522,021 B2
APPLICATION NO. : 12/771115
DATED : August 27, 2013
INVENTOR(S) : Lee Hinkle et al.

Page 1 of 1

It is certified that error appears in the above-identified patent and that said Letters Patent is hereby corrected as shown below:

In the Claims

In column 15, line 1, in Claim 8, delete "method for" and insert -- method of --, therefor.

Signed and Sealed this
Twelfth Day of November, 2013

Teresa Stanek Rea
*Deputy Director of the United States Patent and Trademark Office*